Patented May 17, 1932

1,858,362

UNITED STATES PATENT OFFICE

MAURICE KAHN, OF PARIS, FRANCE

MANUFACTURE AND EXTRACTION OF NITROGENOUS PRODUCTS FROM PRODUCTS OF ANIMAL ORIGIN

No Drawing. Application filed July 5, 1924, Serial No. 724,540, and in France July 7, 1923. Renewed July 26, 1928.

A series of antiseptic substances that can be readily eliminated, carbon bisulphide in particular and in general all the substances hereinafter recited permit fish and broadly all products of animal origin containing a proteolytic ferment to be treated by autolysis or by heterolysis or by a combination of autolysis and of heterolysis.

By the term "heterolysis," as used herein, is signified a biotic or biological action, analogous to that of autolysis; said action being caused by proteolytic ferments introduced from without (hetero=other), whereas autolysis is caused by ferments contained in the cells of the albuminoid substance itself. By the term "auto-heterolysis" is signified a biological action caused by the presence and cooperation of both the ferments of the albuminoid itself and also the ferments introduced from without. In some instances the action of the ferments of the albuminoid undergoing treatment is not sufficiently strong to effect the desired result, making it necessary to add extraneous ferments.

Such substances are:

(1st) Hydrocarbons, benzene, as toluenes.

(2nd) Chloruretted halogenous derivatives.

(a) Fatty series: Chloroform—tetrachloride of carbon—dichlorethylene—trichlorethylene—tetrachloracetylene—pentachlorethane—symmetrical and unsymmetrical dichlorethanes—chlorides of propyl, butyl and liquid homologues thereof—chlorides of propylene, butylene and liquid homologues thereof.

(b) Aromatic series: Mono and poly chloro and bromobenzenes and homologues thereof—chlorides of benzyl and homologues thereof and their nitrated derivatives.

(3rd) Alcohols: Higher alcohols, butylic (standard and isobutylic) amylic etc.

(4th) Sulphuretted derivatives such as carbon bisulphide—thiocarbonates—mercaptans—fatty sulphides.

(5th) Aldehydes: Formalhehyde and its product of condensation with ammonia hexamethylenetetramine—acetaldehyde — chloral—acroleine—crotonic aldehyde—furfurol.

(6th) Ketones of the fatty series or their mixture.

(7th) Phenols: phenol—cresols and homologues thereof pure or mixed, their halogenous and nitrated, alcoholated etc., derivatives.

(8th) Bromides soluble, alkaline and alkaline-earth.

(9th) Quinolin and its homologues. The raw mixture of the bases from tar distillation.

I can use the above mentioned bodies either singly or mixed with one another or again with inert bodies added.

If I take carbon bisulphide as the easily eliminated antiseptic substance, I find that it renders proof against any microbian action a mass of matter that varies according to the animal product treated; in certain cases five to ten parts of carbon bisulphide per thousand of animal matter are sufficient for efficiency.

If I use carbon bisulphide, one liter of this product permits 150 to 200 kilograms of animal matter to be preserved from any microbian action and to successfully undergo autolysis or heterolysis or auto-heterolysis.

By means of suitable devices or apparatus I crush the animal matter.

I add the required quantity of carbon bisulphide taking care to stir the mass thoroughly. I then bring the mass to be treated into a temperature suitable for auto-heterolysis.

For this purpose I use a drying room constituted by vats made of cement or vats made of glass-lined cement or large vats formed by slabs of slate securely bolted together; but whether made of cement or of slate, these vats must be contained in a chamber the walls of which are rendered non-conductive of heat by means of agglomerated cork or of any other insulating material, the best temperature being maintained circa 40° C.

As gas (especially carbonic acid gas) tends to escape, particularly during the first days of the operation, it is advisable to provide devices to permit such escape so as to avoid overpressure. I have also been led to provide devices for stirring the mass during the course of operations. At the end of from 15 to 20 days auto-heterolysis is completed and I obtain a mass composed of various valuable elements which have to be separated from one another, wherefore it is caused to pass over very fine meshed and continuously moving sieves.

In these sieves will remain all the coarse materials unaffected by auto-heterolysis and more especially the skeleton or bony framework of the original material undergoing treatment.

Treated with tetrachloride of carbon, the product so obtained yields on the one hand, a most valuable oil which varies greatly as to quantity according to the kind of animal matter originally treated, and on the other hand, a powder usable as manure and which is rich in phosphate while still containing an appreciable though small quantity of nitrogen. The liquid that has passed through the sieve and is of a rather thick consistency suggestive of glycerine has then to be filtered in a filter press, or in vacuum etc.

I then obtain:

On the filter a complex fatty body which is highly valuable for use in treating hides or which can be separated into oil and pulverulent powder.

The liquid which passes through the filter is of a fine brown or reddish colour. I can dry this product in any of the ways now in industrial use and bring it to a pasty condition or to a very fine powder. This product has been freed by air draught or blast from any traces of carbon bisulphide it may still contain. (Many other industrial means such as a current of steam etc. can be readily used to eliminate the antiseptic substance.)

The paste obtained is pleasantly palatable and rich in nitrogenous matters (it contains in appreciable quantity amino acids such as, tyrosine, tryptophane etc.). It is calculated to make most valuable alimentary broths, to enter very usefully as a part into the food allowance of animals (especially for pig breeding).

In certain cases, a layer of oil is found on top of the matter obtained at the end of auto-heterolysis, which layer can be separately collected by decanting.

Quite obviously, centrifugal methods, or any other industrial means of separation, can be added to the above indicated ones.

In order to hasten auto-heterolysis and to treat animal matter, I can add, besides the proteolytic ferment contained in said matter, gastric or intestinal mucous membranes, pancreatine, papaine or any other additional proteolytic ferment taken from the animal or from the vegetable kingdom and according to cases I effect autolysis, heterolysis or auto-heterolysis.

Having now particularly ascertained and described the nature of my said invention as well as the manner in which the same is to be performed, I declare that what I claim is:

1. A process for the manufacture of nitrogenous products, comprising the steps of mixing carbon bisulphide with a protein product of animal origin and a proteolytic ferment other than such as may be present in said product of animal origin; subjecting the mixture to heat at a moderate temperature for a period long enough to effect auto-digestion; and separating the liquid extract obtained thereby from the solid residue.

2. A process for the manufacture of nitrogenous products, comprising the steps of mixing carbon bisulphide with a protein product of animal origin in the proportion of 5–10 parts of carbon bisulphide per 1000 parts of the animal product.

3. A process for the manufacture of nitrogenous products, comprising the steps of mixing carbon bisulphide with a protein product of animal origin and a proteolytic ferment other than such as may be present in said product of animal origin; subjecting the mixture to heat at a moderate temperature so as to prevent destruction of said ferment and for a period long enough to effect auto-digestion; and separating the liquid portion of the resultant product from the solid residue.

4. A process according to claim 3, in which the carbon bisulphide and the protein product of animal origin are mixed in the proportion of 5–10 parts of the former per 1000 parts of the latter.

5. The process for the manufacture of nitrogenous products, comprising the steps of mixing an easily-removable volatile antiseptic substance with a protein product of animal origin containing a proteolytic ferment; adding thereto another proteolytic ferment; subjecting the final mixture to heat at a moderate temperature so as to prevent destruction of said ferments and for a period long enough to effect auto-digestion; and separating the liquid portion of the resultant product from the solid residue.

6. A process according to claim 5, in which the separated liquid portion is dried to powder form.

7. A process for the manufacture of nitrogenous products, comprising the steps of mixing an easily removable volatile antiseptic substance other than a compound of the harmonic series to which nitro-chloroform belongs with a protein product of animal origin and a proteolytic ferment other than such as may be present in said product of animal origin, subjecting the mixture to heat at a moderate temperature for a period long enough to effect digestion, and separating the liquid extract obtained thereby from the solid residue.

8. A process for the manufacture of nitrogenous products, comprising the steps of mixing an easily removable volatile antiseptic substance other than a compound of the harmonic series to which nitrochloroform belongs with a protein product of animal origin and a proteolytic ferment other than such as may be present in said product of animal origin; subjecting the mixture to a moderate degree of heat such that said proteolytic ferment is not destroyed and for such a period time as to effect auto-digestion of the organic substances, and separating the liquid extract obtained thereby from the solid residue.

9. A process for the manufacture of nitrogenous products, comprising the steps of mixing an easily-removable volatile antiseptic substance with a product of animal origin and a proteolytic ferment other than such as may be present in said product of animal origin; subjecting the mixture to heat at a moderate temperature so as to prevent destruction of said ferment and for a period long enough to effect auto-digestion; and separating the liquid portion of the resultant product from the solid residue.

10. A process for the manufacture of nitrogenous products, comprising the steps of mixing an easily-removable volatile antiseptic substance with a product of animal origin and a proteolytic ferment other than such as may be present in said product of animal origin; subjecting the mixture to heat at a moderate temperature and for a period long enough to effect auto-digestion; and separating the liquid extract obtained thereby from the solid residue.

11. A process for the manufacture of nitrogenous products, comprising the steps of mixing an easily-removable volatile antiseptic substance with a product of animal origin and a proteolytic ferment other than such as may be present in said product of animal origin; subjecting the mixture to heat at a moderate temperature and for a period long enough to effect auto-digestion; separating the liquid extract obtained thereby from the solid residue; and finally drying the liquid extract to powder form.

12. A process according to claim 11, in which the product of animal origin is crushed previous to being mixed with the antiseptic substance.

In testimony whereof I affix my signature.

MAURICE KAHN.